United States Patent Office 3,084,133
Patented Apr. 2, 1963

3,084,133
TAPE JOINT CEMENT COMPRISING POLYVINYL ALCOHOL AND CLAY AND METHOD FOR PREPARING SAME
Julius Sirota, South Plainfield, and Benjamin D. Jubilee, Plainfield, N.J., assignors to National Starch and Chemical Corporation, New York, N.Y., a corporation of Delaware
No Drawing. Filed Sept. 22, 1959, Ser. No. 841,446
11 Claims. (Cl. 260—29.6)

This invention relates to a tape joint cement, and to a novel method for making such a cement. It is our object to provide a dry tape joint cement composition which mixes more readily with water, as compared to heretofore known compositions, to form a workable cement. Our further object is to provide such a dry composition which requires less water to achieve a workable consistency, and thus results in a cement of higher solids content. Another object is to provide a tape joint cement which, after application and drying, is less subject to shrinking and cracking than materials heretofore employed. Still another object is to provide a tape joint of excellent binding power, which will form a surface, when applied and dried, that is readily sanded and coated with paint or wallpaper.

We have found that the above and other notable improvements are achieved by employing a new type of binder, and more particularly by a novel method of incorporating the binder in the dry cement composition.

The trend in modern housing construction is toward the use of wall board in place of lathing and plaster. When wall boards are put up, there is necessarily a certain space between them. Even though this space be only a fraction of an inch, it is essential that the gaps be filled, or bridged, in order that a smooth wall be obtained, unmarred by seams.

The most common practice has been to apply a tape, and a tape joint cement, over the seams between the wall boards. The tape joint cement is ordinarily sold and distributed in the form of a dry mixture comprising a major portion of an inert filler and a minor portion of a binder. At the point of use, the compound is mixed with water until a suitable working consistency is obtained. A soft, spreadable, but non-flowing mass is ordinarily desired. This cement is then applied over the gaps between the boards, and spread for an inch or two on either side of the gaps. After a section of the wall has been thus treated, a perforated tape is pressed onto the still wet cement, so that it is embedded therein. Sometimes an additional application of the tape joint cement is made over the tape. When dry, the joints are smoothed down, so that a perfectly even, seamless wall remains.

The filler portion of the cement composition is ordinarily clay, or any one of a number of other inert, relatively inexpensive materials such as dolomite, ground limestone, asbestos, mica, silica and the like. The binder is the more important component of the cement, since it serves to bind the ultimate applied cement so that it does not crumble to a powdery mass, and it must also serve to keep the paper tape powerfully embedded in the cement. It also functions, of course, as the adhesive to bond the cement to the wall board. Powdered casein has been the binder hitherto most commonly employed, but it suffers from certain disadvantages. Thus, when a dry casein-clay tape joint cement composition is stirred with water, to form the usuable cement, a half hour or more is required before the cement composition has been thoroughly dispersed and "tempered" so as to attain a smooth, workable viscosity. This is partly due to the fact that casein does not disperse readily in cold water, but first goes through a period of swelling and peak viscosity, and then only gradually disperses in the water and drops to a relatively stable viscosity. In this respect it resembles most polymeric materials, natural and synthetic, which go through a stage of swelling and peak viscosity before actually dispersing in water. Animal glues, natural gums, and the so-called water soluble high polymeric resins are other examples of this type of slow dispersing material. The time consumed in dispersing a tape joint cement, when taken in terms of produtcion delays and labor costs, is an obviously important factor.

Another disadvantage of casein, and other binders of the type heretofore used, is the relatively large amount of water required to form a dispersion of suitable viscosity. Thus, a typical casein-clay mix containing 10% of casein and 90% of clay, by weight, requires the use of about 65 parts of water per 100 parts of the casein-clay mix, to obtain a dispersion of workable viscosity. The presence of that much water (or, conversely, the relatively low solids content of the cement) greatly enhances the probability of shrinking of the cement mass as it dries, with resultant formation of cracks on the surface. Such cracks defeat one of the purposes of the tape joint cement, namely, to provide a smooth wall over which paint may be applied. This is, of course, in addition to the disadvantages already named—difficulty of dispersion, viscosity variation, etc. Still another difficulty is the excessive spoilage encountered with materials such as casein, which are susceptible to bacterial attack and mold formation.

In seeking replacements for casein, as a binder in tape joint cements, it is necessary to restrict oneself to those which are strong, film-forming binders. If the binder were relatively weak, it would be necessary to use so large a proportion that the amount of clay (or equivalent filler) would be relatively low. This would affect not only the physical properties of the resulting cement, including its rheological characteristics, but also its economic feasibility. The binder should also be one which possesses a rather unusual combination of properties, namely water dispersibility together with the ability to form relatively water resistant dried films.

Among the strong, water-dispersible binders which we have tried for this purpose is polyvinyl alcohol. Polyvinyl alcohol is the product resulting from the hydrolysis of polyvinyl acetate or other polymerized vinyl esters of organic acids. It is available (or can be made) in various degrees of hydrolysis—that is, ranging from products wherein the polyvinyl ester has been only partly hydrolyzed, to those wherein the ester has been 100% hydrolyzed, resulting in a substantially pure polyvinyl alcohol with no residual ester groups. We have found that hydrolyzed polyvinyl esters of organic acids (as for example polyvinyl acetate) and hydrolyzed copolymers of vinyl esters of organic acids with other polymerizable comonomers (as for example the copolymer of vinyl acetate and ethyl acrylate), wherein the vinyl ester has been hydrolyzed within the range 50% to 100%, and wherein the resultant hydrolysis product is at least 50% soluble in water at 20° C., make excellent binders for tape joint cements, provided that they are blended with the inert filler in the manner to be subsequently described.

It would logically be assumed, and in fact had been assumed, that if one wants to make a dry blend of two ingredients, which are to be subsequently dispersed in water, one takes the two dry components and merely mixes them. Thus, a dry blend of cane sugar and table salt, designed to be subsequently dissolved in water, would naturally be made by mixing dry sugar and dry salt. However, in the case of the tape joint cement, it has been found that the mere mixing of dry (albeit water dispersible) polyvinyl alcohol and the filler (e.g., clay) does not result in a product which may subsequently be readily dispersed in water. As already explained, polymeric materials (including the so-called "water soluble" grades of polyvinyl alcohol) do not dissolve instantaneously in water in the manner that sucrose does. Rather, they first go through a stage of swelling, softening and gradual dispersion which is very time-consuming. Thus, a blend of dry clay and dry polyvinyl alcohol, when mixed with water to form a cement, not only requires the better part of an hour to produce a dispersion that even approaches usability, but even then one finds a gritty residue of undispersed polyvinyl alcohol.

We have now found that a dry cement composition of remarkably improved quality and ease of subsequent dispersion is obtained when the polyvinyl alcohol (or equivalent hydrolysis product of a copolymer of a vinyl organic ester and another polymerizable monomer), of the degree of hydrolysis and solubility already described, is mixed with the dry filler, not in the form of the dry powdered polyvinyl alcohol, but rather in the form of an aqueous solution, or dispersion, of the polyvinyl alcohol. In other words, the polyvinyl alcohol, if dry, is first heated in water to form a homogeneous solution (or colloidal dispersion), and then this solution is mixed with the dry filler, in the desired proportions. If one begins with a polyvinyl alcohol which is already in aqueous dispersion (as, for example, the reaction mass resulting from the hydrolysis of an aqueous dispersion of polyvinyl acetate) then one may incorporate this dispersion with the dry filler, instead of first obtaining the polyvinyl alcohol in dry form, re-dispersing it in water and then blending it with the filler.

The proportion of polyvinyl alcohol added to the clay or other filler is such that the water is absorbed by the filler, and the resulting blend is still sensibly dry; that is, it is dry to the touch and in appearance. It is still a dry blend, capable of being packed in paper bags in the same manner as a mixture of dry binder and filler.

Adding the polyvinyl alcohol in pre-dispersed form results in a mixture wherein the polyvinyl alcohol apparently exists in colloidally divided condition. Whatever the mechanism of the dispersal of the binder throughout the filler, the difference in the final mix is remarkable. When the dry tape joint cement composition of our invention is mixed with water, at the point of use, it is found that only a few minutes mixing is required, as against the half hour or more that was essential in the case of the prior known mixes (as for example casein-clay). The mixture does not go through a stage of peak viscosity which needs to be broken down, but rather immediately forms a homogeneous cement of stable viscosity, ready for use. Unlike mixtures of dry polyvinyl alcohol and filler, the mixture of our invention disperses quickly and leaves no residue of gritty, undissolved binder.

A remarkable feature of our product, made by blending an inert filler with a solution of polyvinyl alcohol, is that even after the sensibly dry product has been stored for a month or more, so that the water introduced by the binder solution has presumably evaporated, the product mixes with water to produce a high quality cement just as readily and rapidly as the freshly made material. It might be necessary to use somewhat more water, to compensate for the water which had evaporated, but this nowhere approaches the amount of water required for the prior known mixtures of the casein-clay type.

The mechanics of blending the polyvinyl alcohol solution with the dry filler is simple, and may be accomplished in any suitable and convenient maner. Thus, the binder solution may be sprayed onto the filler, while the latter is agitated in a suitable vessel. Alternatively, the binder solution may simply be poured onto the dry filler, followed by agitation until the binder is thoroughly incorporated in the mass. Other suitable mixing means, such as ball milling and the like, will be apparent to the practitioner.

With reference to proportions, it should be remembered that it is desirable to add as little water as possible to the dry filler, since the mixture should remain essentially dry. It is obvious that we use the word "dry" in a sense that does not connote the anhydrous state, but rather refers to a mixture that is sensibly dry, not moist to the touch, and may be packed as a dry product. Since different fillers (e.g. clay, dolomite, etc.) vary in their absorptive capacity, it is impossible to set forth an absolute value for the maximum amount of binder solution that may be mixed with the filler and still retain a relatively dry product. It is a matter of simple observation, with no intricate experimentation being necessary, to determine for any given filler the maximum amount of solution which may be added without resulting in a moist mix. We have found that the minimum amount of binder solution which should be added to the filler is that amount which will introduce at least 0.25% of polyvinyl alcohol (or equivalent binder), calculated as the dry resin, based on the weight of the filler. On the other hand, quantities of binder greater than 10%, based on the filler, are not ordinarily required.

The concentration of the binder in the solution may be anywhere from about 2.5% to about 40% by weight, depending upon the particular resin employed, its degree of hydrolysis and its water solubility. Ordinarily, we prefer to employ solutions of from 15% to 25% concentration. For any given resin, the object is to make as concentrated a solution as possible, in order to introduce the minimum amount of water into the filler.

As stated, the binder, for use in the composition of our invention, may be the 50% to 100% hydrolysis product of a polymerized vinyl ester of an organic acid (this product being, of course, polyvinyl alcohol), or it may be the 50% to 100% hydrolysis product of a copolymer of vinyl acetate and another polymerizable monomer. This is no limitation on the nature of the comonomer, since the practitioner may choose whichever one he wishes in order to obtain any particular added characteristics. Thus, one may employ the copolymer of vinyl acetate-vinyl chloride, vinyl acetate-acrylic acid, or vinyl butyrate-maleic anhydride, to name but a few. In any case it is the vinyl ester which is the source of the ultimate hydrolysis product for use in our invention. Regardless of what particular hydrolysis product one employs, it should have a degree of hydrolysis of at least 50%, and should have a solubility of at least 50% in water at 20° C.

On the other hand, any attempt to employ a hydrolysis product which is less than 50% soluble (or unable to form at least a gelated mass with equal parts of water) results in inadequate binding power, since it is only the dissolved, or gelated, portion of the resin which subsequently redisperses, when the composition is mixed with water, to give a strong, film-forming binder. Similarly, the use of a product which is less than 50% hydrolyzed would mean that one was adding, in effect, a major portion of relatively insoluble polyvinyl acetate particles, and again the binding power is inadequate. Of course, one might attempt to attain sufficient binding power by employing larger proportions of the resin in relation to the filler, but this would bring the composition outside the realm of commercial feasibility.

It should be pointed out that when we use the words "solution," "solubility," "dispersion" or "dispersible" in connection with a polymeric material such as polyvinyl alcohol, the words do not necessarily refer to a true solution, but rather to a stable, hydrated colloidal dispersion, and the ability to form such a dispersion. Some hydrolysis products which are capable of absorbing at least their weight in water, to form a gel-like mass, would fall within the 50% solubility requirement herein set forth.

The following examples will further illustrate the embodiment of our invention. All parts are by weight, unless otherwise specified.

Example I

To 63 parts of dolomite and 30 parts of clay (of the variety known as "Huber clay #35"), we added 7 parts of an aqueous solution containing 20% by weight of 88% hydrolyzed polyvinyl alcohol, medium viscosity (that is, polyvinyl acetate which had been 88% hydrolyzed). The mixture was agitated in a ball mill for several minutes, resulting in a finely powdered, easy flowing, dry in appearance and to the touch.

The above dry composition was then mixed with water, in the ratio 100 parts dry mix to 25 parts water. It was mixed by hand for 5 to 10 minutes until smooth, and then applied to wall boards in the manner already described. When dried on the wall, a smooth surface was obtained, firmly adhered to the tape and to the wall board. It showed no evidence of shrinking upon aging, and was readily sanded and painted.

It should be noted that whereas 100 parts of the dry mix of this example required only 25 parts of additional water to obtain a cement of suitable viscosity, a similar amount of a casein-clay mix of the type heretofore used in the art required 65 parts of added water. Obviously, this excess of water produces a lower solids wet mix, which in turn leads to excessive shrinkage upon drying. This shrinkage has been found to be 50% to 100% greater, in the prior art types, as compared to the products of our invention.

Whereas our product required only 5 to 10 minutes of mixing with water to obtain a smooth, usable cement, the casein-clay dry mixes had to be stirred with water for from one half to one hour, and then had to be set aside for an additional 20 minutes or so, to "temper." The saving in time and labor costs is self-evident.

The cement of our composition, when adhered to paper (as, for example, the paper tape described earlier) gives a bond with 100% paper tear. That is, the paper is completely torn when attempting to remove it from the cement, indicating powerful adhesion. On the other hand, cement mixes of the type heretofore used give paper tear values in the order of only 50%.

Upon permitting the cement-water mix to stand, our material exhibited substantially no spoilage, whereas the casein mixes were subject to bacterial and other degradation.

It was also found that upon repeating this example again and again, at various times, identical results were obtained. In other words, the composition of our invention is reproducible, because the synthetic nature of the binder employed permits complete control of its properties. On the other hand casein-clay mixes varied from batch to batch because of the inherent variations in the casein, a natural polymer.

Example II

Following the general mixing procedure described in the previous example, we prepared a number of formulations, as listed in the following table.

| Formula No. | Filler | Parts | Binder | Parts |
|---|---|---|---|---|
| 1 | Clay | 100 | 2½% aqueous sol'n of 88% hydrol. polyvinyl alcohol (high viscosity). | 10 |
| 2 | Clay | 100 | 10% aq. sol'n of 88% hyd. polyvinyl alcohol (high viscosity). | 2.5 |
| 3 | Dolomite | 100 | 15% aq. sol'n of 100% hyd. polyvinyl alcohol (medium viscosity). | 15 |
| 4 | Clay | 100 | 15% aq. sol'n of 88% hyd. polyvinyl alcohol (medium viscosity). | 15 |
| 5 | Clay | 100 | 20% aq. sol'n of 88% hyd. polyvinyl alcohol (medium viscosity). | 10 |
| 6 | Clay | 100 | 25% aq. sol'n of 88% hyd. polyvinyl alcohol (medium viscosity). | 5 |
| 7 | Clay | 100 | 40% aq. sol'n of 88% hyd. polyvinyl alcohol (low viscosity). | 25 |
| 8 | Clay | 100 | 25% aq. jelly of 50% hyd. polyvinyl alcohol (high viscosity). | 10 |
| 9 | Limestone | 100 | 20% aq. sol'n of 88% hyd. copolymer of vinyl acetate and acrylic acid (99.5:0.5). | 10 |
| 10 | Talc | 100 | 20% aq. sol'n of 88% hyd. copolymer of vinyl acetate and the half ester of maleic acid (96:4). | 10 |
| 11 | Clay | 100 | 20% aq. jelly of 60% hyd. polyvinyl alcohol (high viscosity). | 10 |
| 12 | Clay | 100 | 20% aq. jelly of 70% hyd. polyvinyl alcohol (high viscosity). | 10 |

It is to be understood that when we speak in the above table of a "hydrolyzed polyvinyl alcohol," this refers to the polyvinyl ester of an organic acid (e.g. polyvinyl acetate) which has been hydrolyzed to the degree set forth. It is common in the art to describe polyvinyl alcohol in this manner.

Each of the above formulations was mixed with water, in the manner described in Example I, the amount of water being sufficient to give a cement of the desired working viscosity. When applied as a tape joint cement, each of the formulations was characterized by the substantial improvements set forth in detail in Example I and elsewhere in this specification.

In some cases it is found desirable to incorporate small amounts of other additives, such as wetting agents, preservatives and the like. The use of such additives is, of course, not precluded in the compositions of our invention.

The practitioner in the art will find it possible to make many variations in materials, proportions and procedures, all coming within the scope of this invention, which is limited only by the following claims.

We claim:
1. A dry tape joint cement composition, capable of being mixed with water to form a wet cement, said composition resulting from the admixture of a dry inert inorganic filler and a binder, said binder comprising an aqueous dispersion of a hydrolysis product selected from the class consisting of hydrolyzed polyvinyl esters of organic acids and hydrolyzed copolymers resulting from the copolymerization of a vinyl ester of an organic acid and another polymerizable monomer, said hydrolysis product having a degree of hydrolysis of from 50% to 100% and being at least 50% soluble in water at 20° C, the amount of said hydrolysis product being within the range 0.25% to 10%, calculated as dry resin, based on the weight of the filler.

2. The dry tape joint cement composition of claim 1 in which the inert filler is selected from the class consisting of clay, talc, ground limestone, asbestos, mica and silica.

3. The dry tape joint cement composition of claim 1 in which the binder is an aqueous dispersion of polyvinyl alcohol.

4. The dry tape joint cement composition of claim 1 in which the binder is an aqueous dispersion of a hydrolyzed copolymer of a vinyl ester of an organic acid and another polymerizable monomer.

5. The dry tape joint cement composition of claim 1 in which the binder is an aqueous dispersion of a hydrolyzed copolymer of vinyl acetate and another polymerizable monomer.

6. The method for making a dry tape joint cement composition, capable of being mixed with water to form a wet cement, which comprises mixing a dry, inert inorganic filler with a binder, said binder being an aqeous dispersion of a hydrolysis product selected from the class consisting of hydrolyzed polyvinyl esters of organic acids and hydrolyzed copolymers resulting from the copolymerization of a vinyl ester of an organic acid and another polymerizable monomer, said hydrolysis product having a degree of hydrolysis of from 50% to 100% and being at least 50% soluble in water at 20° C., the amount of said hydrolysis product being within the range 0.25% to 10%, calculated as dry resin, based on the weight of the filler.

7. The method of claim 6 in which the inert filler is selected from the class consisting of clay, talc, ground limestone, asbestos, mico and silica.

8. The method of claim 6 in which the binder is an aqueous dispersion of polyvinyl alcohol.

9. The method of claim 6 in which the binder is an aqueous dispersion of a hydrolyzed copolymer of a vinyl ester of an organic acid and another polymerizable monomer.

10. The method of claim 6 in which the binder is an aqueous dispersion of a hydrolyzed copolymer of vinyl acetate and another polymerizable monomer.

11. The method for making a tape joint cement for application to wall board which comprises taking a dry composition resulting from the admixture of a dry, inert inorganic filler and a binder, said binder comprising an aqueous dispersion of a hydrolysis product selected from the class consisting of hydrolyzed polyvinyl esters of organic acids and hydrolyzed copolymers resulting from the copolymerization of a vinyl ester of an organic acid and another polymerizable monomer, and mixing said dry composition with sufficient water to provide a wet cement of suitable consistency for application to wall board, the amount of said hydrolysis product being within the range of 0.25% to 10%, calculated as dry resin, based on the weight of the filler.

References Cited in the file of this patent

UNITED STATES PATENTS

| | | |
|---|---|---|
| 2,251,296 | Shipp | Aug. 5, 1941 |
| 2,413,570 | Trister et al. | Dec. 31, 1946 |
| 2,661,308 | Azorlosa | Dec. 1, 1953 |
| 2,892,731 | Claxton | June 30, 1959 |